Patented Dec. 19, 1950

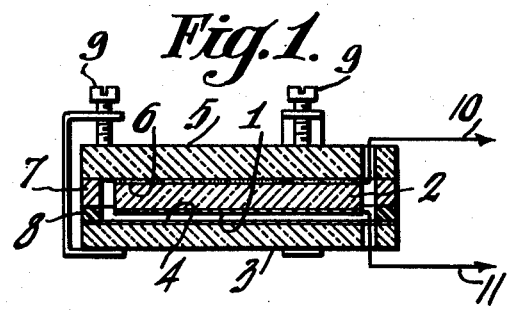
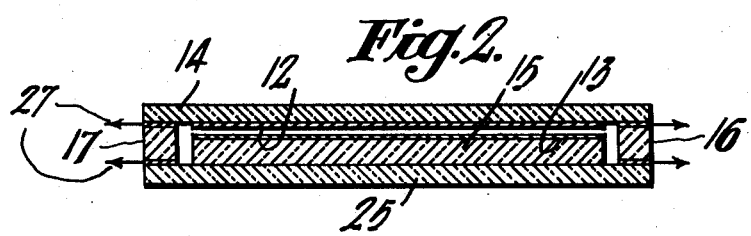
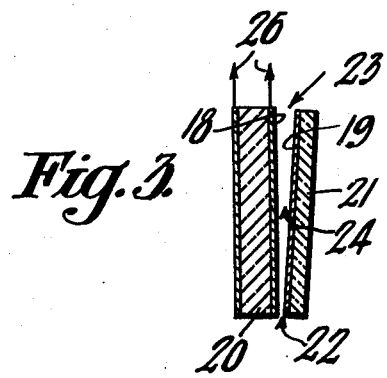

2,534,846

UNITED STATES PATENT OFFICE 2,534,846

COLOR FILTER

Edmund Jack Ambrose, Maidenhead, Derek John Pacey, Purley, and Joseph Gerard Salmon, Heston, England, assignors to Electric & Musical Industries Limited, Hayes, Middlesex, England, a company of Great Britain Application September 8, 1947, Serial No. 772,602
In Great Britain June 20, 1946

Section 1, Public Law 690, August 8, 1946
Patent expires June 20, 1966

8 Claims. (Cl. 178—5.2)

This invention relates to color filters suitable for use in television and for other purposes.

It is known that when light waves are passed from one partially-reflecting surface to another, interference effects occur, and if the incident light is white, the light transmitted varies in color according to the distance apart of said two surfaces.

The object of the present invention is to provide a color filter utilizing such interference effects and one which is readily capable of changing the color of the transmitted light so rendering the filter suitable for use in television.

According to the invention, there is provided a color filter comprising two surfaces so formed that when light is transmitted between said surfaces, interference effects occur, so that light can be transmitted which has a color different from that of the incident light, and means are provided so arranged as to be capable of varying the separation of said surfaces under the control of applied electrical signals so that the color of the transmitted light can be varied under the control of said signals.

Preferably the means for varying the distance apart of said surfaces comprises a piezo-electric crystal or crystals, it being known that the thickness of a piezo-electric crystal can be varied under the control of a potential difference applied between the sides thereof.

In order that the said invention may be clearly understood and readily carried into effect, the same will now be more fully described with reference to different embodiments of the invention, three embodiments suitable for application to television apparatus being diagrammatically illustrated in Figures 1, 2 and 3 respectively of the accompanying drawing.

In a simple embodiment of the invention which is not illustrated, the two surfaces between which interference effects occur comprise the opposite sides of a piezo-electric crystal, said sides being optically flat, and one side of the crystal on which the light to be filtered is intended to be incident is provided with an electrically conducting film which is about 50% reflecting and about 50% transparent to normally incident light, and the opposite side of the crystal is provided with a similar electrically conducting film which is 50% reflecting if the colored light is intended to emerge from the latter surface, or which is 100% reflecting if light is intended to emerge from the surface on which the light is incident. Said films not only serve to cause reflection of the light to produce the interference effects but, since they are conducting, they also serve as electrodes between which a potential difference can be set up so as to cause the thickness of the crystal to vary under the control of applied signals, thus varying the distance apart of said reflecting surfaces so that the color of the transmitted light can be changed according to the applied potential.

With the above described embodiment of the invention, high orders of interference will be encountered owing to the thickness of the crystal, and in cases where it is desirable to dispose the surfaces between which reflection occurs very close together, it will be impracticable to employ a crystal in the above manner. It may be desirable, for example, in some cases to arrange the two surfaces at a distance apart which lies between half the wavelength of blue light and half the wavelength of red light, and Figure 1 illustrates an example of the invention in which the surfaces are arranged to enable such a small separation to be achieved. In the example illustrated, one of the reflecting surfaces 1 is provided by a suitable film on one side of a piezo-electric crystal 2 and the other surface is provided by an optically-flat transparent plate 3 which has a reflecting surface 4 disposed closely to the reflecting surface 1 of said crystal. The reflecting surfaces may be as described in the first-mentioned embodiment of the invention, that is to say, both surfaces may be 50% reflecting or one surface may be 100% reflecting. The crystal is secured to a suitable support 5 and is cemented thereto by optical cement indicated at 6, the support being spaced apart from the other surface 4 of the filter by a suitable spacing element or elements 7 which bear on the plate 3 through the intermediary of flexible packing 8 so that the distance apart of the two surfaces can be adjusted by the provision of, say, three equidistant adjusting screws, two of which are indicated at 9. The side of the crystal opposite to the side having said reflecting surface 1 is provided with an electrode and said optical cement 6 may be such that it can serve as said electrode, a lead 10 being in that case connected to it, while a similar lead 11 is connected to the film on the other side of the piezo-electric crystal, the said film also being electrically conducting so that the necessary potential difference can be set up between the sides of said crystal. If light is to be transmitted through the crystal, the optical cement 6 will necessarily be substantially transparent, i. e., it may be about 15% reflecting. With such a construction, the two surfaces 1 and 4 between which interference effects occur can be disposed at a distance apart of about 2500 Å units. In the case where the surface 4 is arranged to be 100% reflecting, the plate 3 may, of course, be opaque instead of transparent.

In the embodiment of the invention illustrated in Figure 2, in order to provide a filter having a large superficial area, the two surfaces 12, 13 between which interference effects occur may be provided respectively by a thin glass plate or membrane 14 and a further glass plate 15 from which it is spaced by means of a plurality of piezo-electric crystals 16 and 17, which are disposed between the plate 14 and a further plate 25, on which the plate 15 is supported. Two such crystals are visible in the drawing and three at least will normally be employed as, for example, if said plates are of circular form, the crystals being disposed equi-distantly around the circumference of the plates 14 and 15. The crystals have suitable electrodes on opposite sides provided with leads as indicated at 27 so that on applying potential difference to said electrodes, the separation of the two surfaces 12, 13 of said glass plates 14, 15 between which interference effects occur is varied so as to change the color of the transmitted light. One of the surfaces will, of course, be partially reflecting and partially transparent as in the previously described forms of the invention, and the other will be either partially or wholly reflecting.

In employing filters as above described in, for example, color television, the filter may be placed directly in front of a cathode ray receiving tube having a white fluorescent screen and potentials are applied to the crystal or crystals so as to change the color of the light transmitted by the filter in a predetermined order during successive frame scans. If the receiver is of the projection type, the filter may be disposed in the optical system in such a position that parallel rays pass through the filter. The filter may alternatively be employed with either type of receiver as a reflecting mirror having one of its surfaces effectively 100% reflecting, substantially no loss of light occurring in such arrangements. The color filter may also be used at a television transmitter and the color of the light transmitted by the filter may be varied from blue to green and red during successive frames or periods of interlacing. The color of the light transmitted by the filter will, of course, be varied on applying suitable potentials to the crystal or crystals and obviously the color filter at the receiver must be varied in synchronism with that at the transmitter, as is well known. The frequency response of the filters above described may be sufficiently rapid to enable the color of each individual picture element to be varied rather than varying the color of each frame of the scanned picture.

The filters above described are so arranged that the surfaces between which interference effects occur are disposed parallel to one another, but Figure 3 illustrates diagrammatically an embodiment in which the surfaces 18, 19 are disposed obliquely to one another. The surface 18 is provided on the piezo-electric crystal 20, as in the arrangement illustrated in Figure 1, while the surface 19 is provided by a plate 21 which is normally fixed relatively to the crystal 20, and the surfaces are so arranged that in the unstressed condition of the crystal and if the incident light is white, the color produced between the parts of the surfaces at 22 which are closest together is half-way between blue and green, and the color at the parts of the surfaces at 23 which are farthest apart is pure blue. The color at the mid-parts of the surfaces at 24 is then half-way between green and red. With such an arrangement, if the distance between the surfaces is gradually increased, as by withdrawing the surface 18 from the surface 19, the spectral colors will appear to pass across the surface of the filter. The gradual withdrawal of the surface 18 from the surface 19 can be achieved in the example illustrated by applying a sawtooth shaped potential via leads 26 between electrodes on opposite sides of the crystal 20, the spectral colors then being caused to move across the filter during the slowly rising flank of the sawtooth potential, and on the short flank of the sawtooth potential said surface 18 will be returned rapidly to its initial position for the commencement of a fresh cycle. Any suitable mounting may be provided for the crystal 20 and the plate 21, for example, similar to that described with reference to Figure 1; alternatively the surface 18 may be provided as in Figure 2 by a thin plate or membrane supported by a number of piezo-electric crystals provided respectively with electrodes on their opposite sides.

In using a filter such as shown in Figure 3 in a television transmitting system, the filter may be placed under conditions of nearly parallel illumination in front of a photoelectric mosaic screen or photoelectric cathode of a television transmitting tube and the filter then caused to pass the light spectrum completely across the mosaic screen or photoelectric cathode during, for example, three frame scans. The mosaic screen of the transmitting tube is therefore caused to store only one color for each frame scan. At a receiver a similar filter will be employed operated in synchronism with the filter at the transmitter, the cathode ray tube of the receiver employing a white screen which decays to the extent of, say, 50% during each frame scan.

Although the filters described are particularly suitable for use in color television, it will be understood that they are equally applicable for other purposes.

Having now particularly described and ascertained the nature of our said invention and in what manner the same is to be performed, we declare that what we claim is:

1. A color filter comprising a plurality of surfaces so formed that when light is transmitted through said surfaces interference effects occur so that light can be transmitted which has a color different from that of the incident light, a piezo-electric crystal, electrodes associated with said crystal for applying a potential difference between opposite sides of said crystal, said crystal arranged to vary the separation of said surfaces under the control of applied electrical signals so that the color of the transmitted light can be varied under the control of said signals, and wherein one of said surfaces is supported on said crystal, and wherein said surfaces are parallel and the separation thereof is between half the wave length of blue light and half the wave length of red light when the potential difference applied to said electrodes is effectively zero.

2. A color filter comprising a plurality of surfaces so formed that when light is transmitted into said surfaces interference effects occur so that light can be transmitted which has a color different from that of the incident light, a piezo-electric crystal, electrodes associated with said crystal for applying a potential difference between opposite sides of said crystal, said crystal arranged to vary the separation of said surfaces under the control of applied electrical signals so that the color of the transmitted light can be varied under the control of said signals, and wherein one of said surfaces is supported on said crystal, and wherein said surfaces are disposed obliquely to one or the other in such a way that when their separation is varied, the spectral colors are caused to pass across the surface of the filter from which the light emerges.

3. A color filter comprising a plurality of surfaces so formed that when light is transmitted between said surfaces interference effects occur so that light can be transmitted which has a color different from that of the incident light, a light path intersecting said surfaces at substantially right angles, a piezo-electric crystal, electrodes associated with said crystal for applying a potential difference between opposite sides of said crystal, said crystal arranged to vary the separation of said surfaces under the control of applied electrical signals so that the color of the transmitted light can be varied under the control of said crystal, and wherein one of said surfaces is supported on said crystal, and wherein said surfaces are disposed obliquely to one or the other in such a way that when their separation is varied, the spectral colors are caused to pass across the surface of the filter from which the light emerges, and wherein, when the potential difference between said electrodes is effectively zero and the separation of the said surfaces is such that they are closest together, the color transmitted is substantially halfway between blue and green, and when they are farthest apart, the color transmitted is effectively blue.

4. A color filter comprising a plurality of surfaces so formed that when light is transmitted through and between said surfaces interference effects occur so that light can be transmitted which has a color different from that of the incident light, a piezo-electric crystal, electrodes associated with said crystal for applying a potential difference between opposite sides of said crystal, said crystal arranged to vary the separation of said surfaces under the control of applied electrical signals so that the color of the transmitted light can be varied under the control of said signals, and means for providing a sawtooth wave form potential across said electrodes to vary the separation of said surfaces gradually in one sense and rapidly in the opposite sense.

5. A color filter comprising a light path two surfaces so formed that when light is transmitted between said surfaces interference effects occur so that light can be transmitted which has a color different from that of the incident light, each of said surfaces fully intercepting said light path and means are provided so arranged as to be capable of varying the separation of said surfaces under the control of applied electrical signals so that the color of the transmitted light can be varied under the control of said signals, and wherein both of said surfaces are partially reflecting and partially transparent so that the filtered light can be transmitted through said filter.

6. A color filter comprising two substantially parallel surfaces so formed that when light is transmitted into said surfaces interference effects occur so that light can be transmitted which has a color different from that of the incident light, and means are provided so arranged as to be capable of varying the separation of said surfaces under the control of applied electrical signals so that the color of the transmitted light can be varied under the control of said signals, and wherein one of said surfaces is partially reflecting and partially transparent and the other of said surfaces is effectively wholly reflecting so that the filtered light is reflected from said filter.

7. A television transmitter comprising a television transmission tube having an image electrode, a color filter positioned adjacent said image electrode and arranged to transmit light images from the object for transmission to said image electrode said color filter comprising two surfaces so formed that when light is transmitted between said surfaces interference effects occur so that light can be transmitted which has a color different from that of the incident light, and means are provided so arranged as to be capable of varying the separation of said surfaces under the control of applied electrical signals so that the color of the transmitted light can be varied under the control of said signals, and means are also provided for applying electrical signals to said filter so as to vary the separation of said surfaces and cause the filter to transmit different colors successively to said image electrode.

8. A television receiver comprising an image reproducing tube having a screen upon which the received image is reproduced, a color filter comprising two surfaces so formed that when light images are transmitted between said surfaces interference effects occur so that light images can be transmitted which have a color different from that of the incident light, and means are provided so arranged as to be capable of varying the separation of said surfaces under the control of applied electrical signals so that the color of the transmitted light can be varied under the control of said signals, said color filter arranged to transmit light from said screen, and means for applying electrical signals to said filter so as to vary the separation of said surfaces and cause filter to transmit different color images successively from said screen.

EDMUND JACK AMBROSE.
DEREK JOHN PACEY.
JOSEPH GERARD SALMON.

REFERENCES CITED

The following references are of record in the file of this patent:

UNITED STATES PATENTS

| Number | Name | Date |
|---|---|---|
| 1,044,502 | Chrehore | Nov. 19, 1912 |
| 2,010,307 | Leishman | Aug. 6, 1935 |
| 2,109,540 | Leishman | Mar. 1, 1938 |
| 2,118,160 | Cawley | May 24, 1938 |
| 2,185,379 | Myers | Jan. 2, 1940 |
| 2,281,280 | Gabor | Apr. 28, 1942 |
| 2,312,888 | Everest | Mar. 2, 1943 |
| 2,330,172 | Rosenthal | Sept. 21, 1943 |
| 2,352,777 | Douden | July 4, 1944 |
| 2,392,978 | Dimmick | Jan. 15, 1946 |
| 2,455,763 | Harrison | Dec. 7, 1948 |

FOREIGN PATENTS

| Number | Country | Date |
|---|---|---|
| 473,061 | Great Britain | Oct. 5, 1937 |